(12) United States Patent
Xiao

(10) Patent No.: US 9,756,704 B1
(45) Date of Patent: Sep. 5, 2017

(54) LIGHT CONTROL SWITCH

(71) Applicant: Noble Corporation, Zhong Shan (CN)

(72) Inventor: Guo Bei Xiao, Zhong Shan (CN)

(73) Assignee: Noble Corporation, Gaungdong Province (CN)

( * ) Notice: Subject to any disclaimer, the term of this patent is extended or adjusted under 35 U.S.C. 154(b) by 0 days.

(21) Appl. No.: 15/218,887

(22) Filed: Jul. 25, 2016

(30) Foreign Application Priority Data

May 13, 2016 (CN) .................... 2016 2 0442716 U

(51) Int. Cl.
*H05B 37/02* (2006.01)

(52) U.S. Cl.
CPC ................ *H05B 37/0218* (2013.01)

(58) Field of Classification Search
CPC ................................ H05B 37/0218
See application file for complete search history.

(56) References Cited

U.S. PATENT DOCUMENTS

| | | | | |
|---|---|---|---|---|
| 4,531,810 A * | 7/1985 | Carlsen | ................ | G02B 6/32 385/137 |
| 5,175,780 A * | 12/1992 | Sano | ................ | G02B 6/3514 250/227.22 |
| 5,397,888 A * | 3/1995 | Muramatsu | ................ | E06B 9/24 250/205 |
| 2003/0062841 A1* | 4/2003 | Norling | ................ | H05B 39/042 315/149 |
| 2003/0169960 A1* | 9/2003 | Zhou | ................ | G02B 6/3524 385/16 |
| 2006/0091822 A1* | 5/2006 | Bierman | ................ | H05B 37/0218 315/244 |
| 2007/0156256 A1* | 7/2007 | Jung | ................ | G05B 15/02 700/19 |
| 2007/0214812 A1* | 9/2007 | Wagner | ................ | A47F 3/0482 62/129 |
| 2008/0122579 A1* | 5/2008 | German | ................ | H01R 13/6683 340/10.1 |
| 2014/0049972 A1* | 2/2014 | McGuire | ................ | F21V 21/00 362/427 |
| 2014/0262057 A1* | 9/2014 | Chambers | ................ | E06B 9/68 160/5 |
| 2015/0381271 A1* | 12/2015 | Li | ................ | H04B 10/071 398/21 |
| 2016/0004017 A1* | 1/2016 | Zhao | ................ | G02B 6/3817 385/76 |

* cited by examiner

*Primary Examiner* — Alexander H Taningco
*Assistant Examiner* — Kurtis R Bahr
(74) *Attorney, Agent, or Firm* — Lewis Roca Rothgerber Christie LLP

(57) ABSTRACT

An automatic light control switch includes: a housing configured to receive an optical fiber; a built-in light sensor located in the housing and configured to directly detect light through the housing; an external light sensor located in the housing and shielded from light, the external light sensor being configured to be coupled to the optical fiber and to detect light transmitted by the optical fiber; and a drive controller configured to: determine, automatically, a usage condition as one of an indoor condition and an outdoor condition in accordance with a condition signal; in response to determining that the usage condition is the indoor condition, disable the built-in light sensor and enable the external light sensor; and in response to determining that the usage condition is the outdoor condition, enable the built-in light sensor and disable the external light sensor.

16 Claims, 3 Drawing Sheets

LIGHT CONTROL SWITCH

CROSS-REFERENCE TO RELATED APPLICATION(S)

This application claims priority to and the benefit of Chinese Patent Application No. 201620442716.1, filed in the State Intellectual Property Office of the People's Republic of China on May 13, 2016, the entire disclosure of which is incorporated herein by reference.

FIELD

Aspects of embodiments of the present invention relate to a light switch control, in particular, a light-sensitive switch circuit capable of automatic determination of indoor and outdoor use.

BACKGROUND

Lamps are widely used to provide outdoor and indoor lighting, and to serve illumination needs of other places. Indoor lighting is generally controlled by a touch switch or a remote control, without regard to whether it is day and night, while outdoor lighting (e.g., garden lights, lawn and street lamps, etc.) is generally controlled based on whether it is day and night in order to conserve power. In particular, outdoor lighting is generally controlled by a drive controller to be turned off during the day and to be turned on at night. The drive controller generally includes two parts: a power supply portion for enabling filtering, rectification, AC-DC power conversion (e.g., a buck converter), and other functions; and a switching control part for providing main power switch control, mode control and other functions. The switching control part can implement the power conservation aspects by using light exposure to detect day and night and thereby control the outdoor lighting to be turned off during the day and to be turned on at night.

Although a lighting control switch can provide power conservation in outdoor lighting systems as described above, this is conditioned that the lighting control switch is located outdoors such that it can receive and detect direct sunlight (e.g., so that it can determine ambient lighting conditions). However, if the drive controller and the lighting control switch for the outdoor lighting system are located indoors, then the control system will not work properly because it will not be able to detect daytime and nighttime conditions. In addition, it is assumed that; for real and practical needs such as for safety reasons, the drive controller is typically located indoors such as in an underground garage or in a room. Therefore, there is a problem in controlling outdoor lighting using a drive controller located indoors, where the drive controller is configured to apply lighting control based on day or night conditions, and where the drive controller is based on an existing switch control circuit.

SUMMARY

Aspects of embodiments of the present invention are directed to a light-sensitive switch configured to automatically identify indoor and outdoor usage.

According to one embodiment of the present invention, an automatic light control switch includes: a housing configured to receive an optical fiber; a built-in light sensor located in the housing and configured to directly detect light through the housing; an external light sensor located in the housing and shielded from light, the external light sensor being configured to be coupled to the optical fiber and to detect light transmitted by the optical fiber; and a drive controller configured to: determine, automatically, a usage condition as one of an indoor condition and an outdoor condition in accordance with a condition signal; in response to determining that the usage condition is the indoor condition, disable the built-in light sensor and enable the external light sensor; and in response to determining that the usage condition is the outdoor condition, enable the built-in light sensor and disable the external light sensor.

The automatic light control switch may further include: a micro-switch configured to be physically switched by the presence of the optical fiber in the housing, wherein a switching state of the micro-switch corresponds to the condition signal, and wherein the drive controller is configured to determine, automatically, the usage condition in accordance with the switching state of the micro-switch.

The automatic light control switch may further include: an optical sensor switch configured to be optically switched by the presence of the optical fiber in the housing, wherein a switching state of the optical sensor switch may correspond to the condition signal, and wherein the drive controller may be configured to determine, automatically, the usage condition in accordance with the switching state of the optical sensor switch.

The drive controller may be configured to determine, automatically, the usage condition in accordance with the condition signal received from the built-in light sensor and the external light sensor, the drive controller may be configured to determine the usage condition to be the indoor condition in response to receiving signals indicating detection of light by the external light sensor, and the drive controller may be configured to determine the usage condition to be the outdoor condition in response to receiving signals indicating the detection of light by the built-in light sensor and no signals indicating the detection of light by the external light sensor.

The built-in light sensor may include a photodiode.
The external light sensor may include a photodiode.
The built-in light sensor may include a photoresistor.
The external light sensor may include a photoresistor.

According to one embodiment of the present invention, a method for controlling an automatic light control switch in accordance with an indoor or an outdoor usage condition, the automatic light control switch including a built-in light sensor, an external light sensor configured to be connected to an optical fiber, and a drive controller including a processor and memory, the method includes: receiving, by the drive controller, a condition signal indicating an indoor condition or an outdoor condition; determining, by the drive controller, a usage condition as one of the indoor condition and the outdoor condition in accordance with the condition signal; in response to determining that the usage condition is the indoor condition, disabling the built-in light sensor and enabling the external light sensor; and in response to determining that the usage condition is the outdoor condition, enabling the built-in light sensor and disabling the external light sensor.

The automatic light control switch may further include a micro-switch configured to be physically switched by the presence of the optical fiber, and the method may further include: determining a switching state of the micro-switch; outputting the switching state of the micro-switch as the condition signal; and determining the usage condition in accordance with the switching state of the micro-switch.

The automatic light control switch may further include an optical sensor switch configured to be optically switched by the presence of the optical fiber, and the method may further include: determining a switching state of the optical sensor switch; outputting the switching state of the optical sensor switch as the condition signal; and determining the usage condition in accordance with the switching state of the optical sensor switch.

The method may further include: determining the usage condition in accordance with the condition signal received from the built-in light sensor and the external light sensor; determining the usage condition to be the indoor condition in response to receiving signals indicating detection of light by the external light sensor; and determining the usage condition to be the outdoor condition in response to receiving signals indicating detection of light by the built-in light sensor and no signals indicating the detection of light by the external light sensor.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention are shown and described, by way of illustration. As those skilled in the art would recognize, the invention may be embodied in many different forms and should not be construed as being limited to the embodiments set forth herein.

Figure 1:
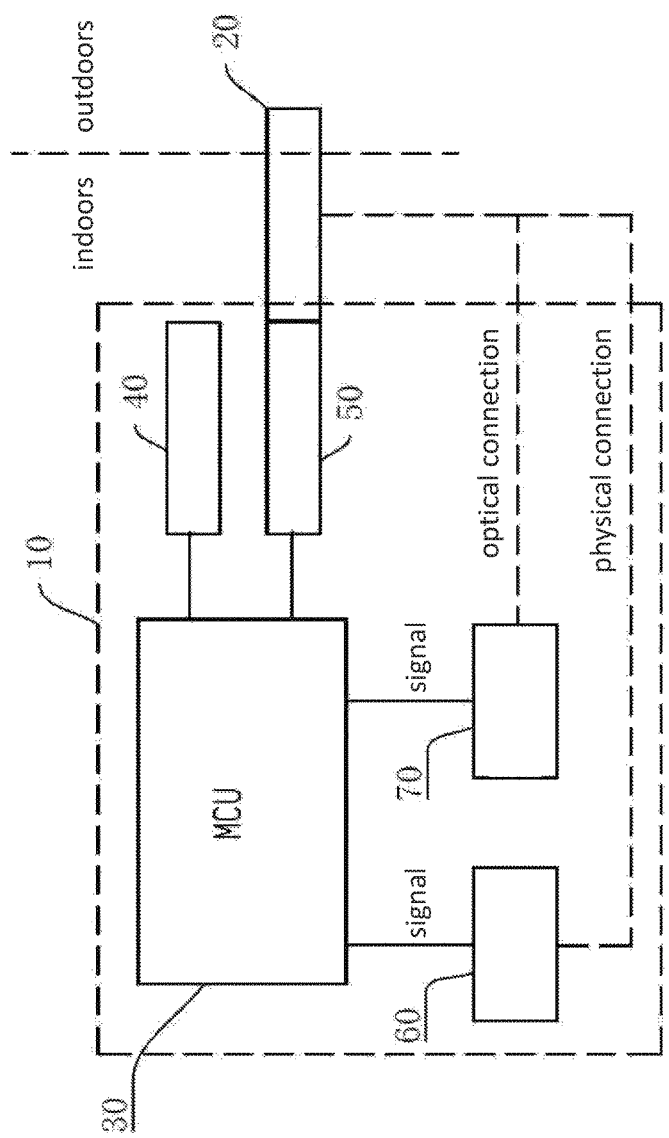
FIG. 1 is a block diagram of an indoor and outdoor automatic light control switch including a light-sensitive switch circuit according to one embodiment of the present invention.

Referring to FIG. 1, according to one embodiment of the present invention, an indoor and outdoor automatic light control switch 10 includes a housing that contains a lamp driving controller 30 (e.g., system on a chip SoC, microcontroller, microcontroller unit, or MCU) and an external optical fiber (or optical fiber or fiber optic cable) 20 connected to the indoor and outdoor automatic light control switch 10. In more detail, the indoor and outdoor automatic light control switch 10 includes the driving controller MCU 30, a built-in light sensor 40, external light sensor 50, and an indoor and outdoor scene recognition module implemented in the driving controller MCU 30.

The housing of the indoor and outdoor automatic light control switch 10 is configured to receive the external optical fiber. For example, in one embodiment, the housing includes an opening having a cross sectional shape that is large enough to accommodate the external optical fiber 20 (e.g., a circular opening having a diameter greater than the diameter of the external optical fiber). The external optical fiber 20 is used to penetrate the housing of the indoor and outdoor automatic light control switch 10 in order to provide the external light sensor 50 with information about the outdoor environment. The external light sensor 50 is shielded from detecting light in the neighboring environment (e.g., in the environment of the automatic light control switch 10). For example, the opening of the housing may have an opaque or substantially opaque cover or flap that prevents light in the neighboring environment from entering through the opening. The opaque cover of the opening may be removed or displaced when the external optical fiber 20 is inserted into the housing. Therefore, when no external optical fiber 20 is connected to the indoor and outdoor automatic light control switch 10, the external light sensor 50 receives no light information, and, instead, the built-in light sensor 40 may be configured to detect the lighting conditions of the neighboring environment, as described in more detail below.

In various embodiments of the present invention, the MCU 30 is implemented as a microcontroller including a processor and memory, which may be referred to herein as an MCU. In other embodiments of the present invention, the MCU is a system on a chip (SoC) or a system in package (SiP) including a processor and memory. In various embodiments of the present invention, the memory stores instructions that, when executed by the processor, cause the processor to receive data from peripherals connected to the MCU 30 and to transmit signals to control peripherals connected to the MCU 30.

The MCU 30 of the indoor and outdoor automatic light control switch 10 selectively enables the built-in light sensor 40 or the shielded external light sensor 50 based on a usage condition of the indoor and outdoor automatic light control switch 10, where the usage condition is automatically determined by the MCU 30 in accordance with a condition signal. In more detail, in response to the MCU 30 determination that the indoor and outdoor automatic light control switch 10 is used or located indoors (determination of an indoor condition), then the built-in light sensor 40 can be disabled and the external light sensor 50 is enabled. In other words, in the indoor condition, the external optical fiber 20 is connected to the housing 10 in order to provide information about the lighting environment outdoors (e.g., from a remote location or a different lighting environment, such as the outside) to the external light sensor 50, which is connected to the MCU 30, and the built-in light sensor will not provide relevant information about the lighting environment outdoors.

On the other hand, in response to the MCU 30 determination that the indoor and outdoor automatic light control switch 10 is used or located outdoors (determination of an outdoor condition), then the built-in light sensor 40 is enabled and the external light sensor 50 can be disabled. In other words, in the outdoor condition, the external optical fiber 20 is not needed (e.g., is not connected to the housing 10), and the built-in light sensor 40 may be used instead of the external light sensor 50 to directly detect outdoor lighting conditions (e.g., to determine whether it is day or night).

The built-in light sensor 40 and the external light sensor 50 may be configured to detect light in a different portion of the spectrum than the light emitted by the lighting controlled by the automatic light control switch 10. For example, the built-in light sensor 40 and the external light sensor 50 may be configured to detect ultraviolet light, which may not be emitted by the controlled lighting, but which is generally present during daylight.

Therefore, the MCU 30 can selectively enable and disable the built-in light sensor 40 and/or the external light sensor 50 based on whether or not the external optical fiber 20 is connected (e.g., based on characteristics of the signal detected by the external light sensor 50) as an indication of whether the automatic light control switch 10 is installed indoors or outdoors.

In addition, detection of whether the automatic light control switch 10 is installed in an indoor or an outdoor environment (e.g., determination of an indoor condition versus an outdoor condition) according to various embodiments of the present invention will be described in more detail below:

According to one embodiment of the present invention, the indoor and outdoor automatic light control switch 10 includes a micro-switch 60. When the external optical fiber 20 is physically inserted into the housing of the indoor and outdoor automatic light control switch, the external optical fiber 20 physically actuates the micro-switch 60 (as shown by the dashed line in FIG. 1 labeled "physical connection"), thereby changing the switching state of the micro-switch (e.g., from open to closed), and thereby providing a condition signal to the MCU 30 that the external optical fiber 20 is connected to external light sensor 50 in the indoor and outdoor automatic light control switch 10.

In addition, the indoor and outdoor automatic light control switch 10 may include an optical sensor switch 70 (e.g., a photoelectric sensor, a photodetector, a photodiode, etc.) located near or in a physical channel or passage configured to receive the external optical fiber 20. In this way, when the external optical fiber 20 is inserted into the indoor and outdoor automatic light control switch 10 for indoor use, the light emitted by the light emitting diode is sheltered or blocked by the external optical fiber, and the optical sensor switch 70 detects "no light" passing along the channel or passage (as shown by the dashed line in FIG. 1 labeled "optical connection"), thereby changing a switching state of the optical sensor switch (e.g., from closed to open), and thereby allowing the optical sensor switch 70 to provide a condition signal to the MCU 30 that the external optical fiber 20 is connected to external light sensor 50 in the indoor and outdoor automatic light control switch 10.

However, embodiments of the present invention are not limited to the mechanical and optical embodiments described above. According to one embodiment, logic programmed in the MCU 30 can be used to determine the current location of the indoor and outdoor automatic light control switch 10 during initial power-on without the use of a micro-switch 60 and without the use of an optical sensor switch 70. For example, the built-in light sensor 40 and the external light sensor 50 may have four different states:

TABLE 1

| State | Built-in light sensor | External light sensor | Inferred conditions |
| --- | --- | --- | --- |
| 1 | Light signals | Light signals | Day, cable inserted |
| 2 | Light signals | No light signals | Day, no cable inserted OR Night |
| 3 | No light signals | Light signals | Day, cable inserted |
| 4 | No light signals | No light signals | Night |

As shown in Table 1, above the first state and the third state both correspond to daytime with an optical fiber 20 inserted (e.g., in the third state, the built-in light sensor 40 may be inside a dark room). When the first state or third state conditions are detected, the MCU 30 detects an indoor usage condition in which the built-in light sensor can be disabled in order to control the outdoor lighting to be turned off when light signals are detected by the external light sensor 50 (e.g., at daytime). The detected indoor usage condition can be saved into the memory of the MCU 30. The fourth state corresponds to night time. In the first, third, and fourth states, it can be determined whether to disable the built-in light sensor 40 or the external light sensor 50. In the second state, where the MCU 30 receives signals indicating the detection of light by the built-in light sensor 40 and no signals indicating the detection of light by the external light sensor 50, there are two possibilities: either it is night time and the optical fiber 20 is inserted; or it is daytime with no connected optical fiber 20. In this second state, if the user wishes to enable the external light sensor 50 (for an indoor usage condition); the user may manually supply light to the inlet of the optical fiber 20, which will then be regarded as default by the MCU 30 for enabling the external light sensor 50 and disabling the built-in light sensor in the indoor usage condition. The MCU 30 may be power cycled (e.g., turned off and turned on again) to resume use of the built-in light sensor 40 (for use in accordance with the outdoor usage condition).

Figure 2:
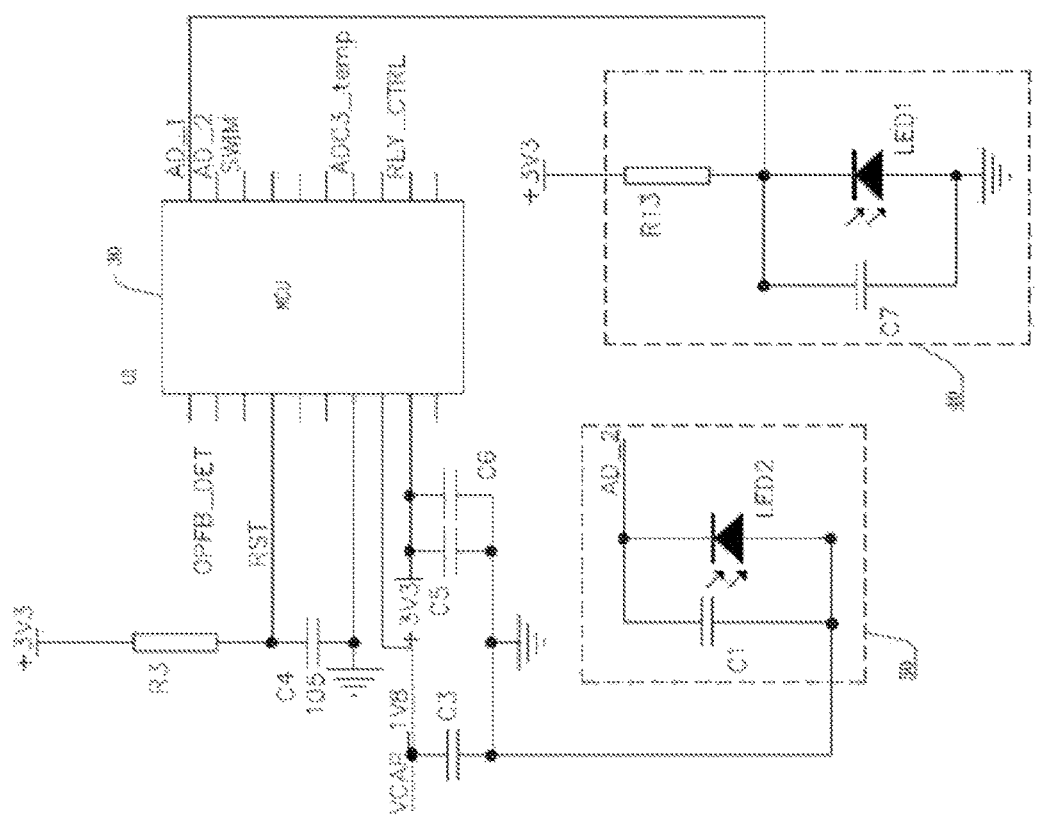
FIG. 2 is a circuit diagram of an indoor and outdoor automatic light control switch including a light-sensitive switch circuit according to one embodiment of the present invention.

FIG. 2 is a circuit diagram of an indoor and outdoor automatic light control switch including a light-sensitive switch circuit according to one embodiment of the present invention. As shown in FIG. 2, according to one embodiment of the present invention, the built-in light sensor 40 and the external light sensor 50 are implemented using photodiodes LED1 and LED2, respectively. However; embodiments of the present invention are not limited thereto and other types of optical sensors such as photoresistor may be used instead or in addition.

As shown in FIG. 2, the built-in light sensor 40 includes photodiode LED1 having an anode electrode coupled to ground and a cathode electrode coupled to a node. A capacitor C7 is coupled in parallel with the photodiode LED1, and a resistor R13 is coupled in series between the node and a voltage source +3V3. The node is also connected to an analog to digital converter pin AD_1 of the MCU 30, such that the MCU 30 can measure a signal (e.g., a voltage) from the built-in light sensor 40 regarding the amount of light detected by the built-in light sensor 40.

In addition, as shown in FIG. 2, the external light sensor 50 includes a photodiode LED2 connected in parallel with a capacitor C1. The cathode of the photodiode LED2 is connected to an analog to digital converter pin AD_2 of the MCU 30. In addition, the anode of the photodiode LED2 is connected to a node that is connected to ground.

As shown in FIG. 2, two capacitors C5 and C6 are coupled between ground and a voltage source +3V3. In addition, a capacitor C3 is coupled between ground and pin VCAP_1V8 of the MCU 30.

Figure 3:
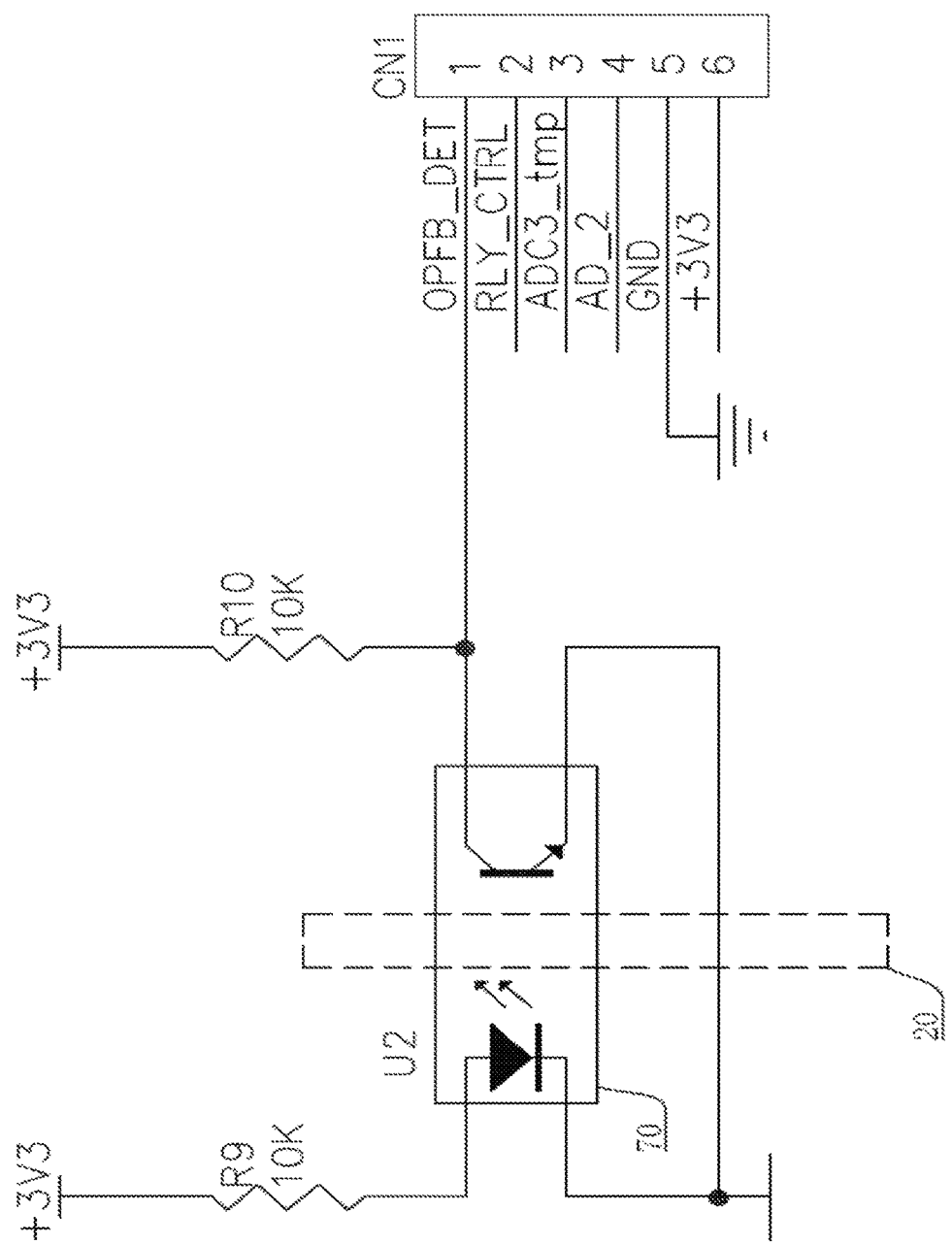
FIG. 3 is a circuit diagram of a photoelectric sensor switch configured to detect the presence of an optical fiber (or fiber optic cable) according to one embodiment of the present invention.

FIG. 3 is a circuit diagram of an optical sensor switch 70 configured to detect the presence of an optical fiber (or fiber optic cable) according to one embodiment of the present invention. Referring to FIG. 3, the optical sensor switch 70 is configured to supply a signal to the MCU 30 regarding the presence of an optical fiber (e.g., as shown in FIG. 3, connected to pin OPFB_DET of MCU 30). The optical sensor switch 70 may be coupled to a first resistor R9 (e.g., a 10KΩ resistor) having a first electrode coupled to a voltage source +3V3 and a second electrode coupled to an anode electrode of a light emitting diode of the optical sensor switch 70. The anode of the light emitting diode may be coupled to a first node (where the node may be, for example, coupled to ground). The optical sensor switch 70 may also include a light sensing component (e.g., a phototransistor, a photoresistor, or a photodiode), where the one terminal (e.g., the emitter) of the light sensing component is coupled to the first node (e.g., coupled to ground) and the other terminal (e.g., the collector) is coupled to a second node. A second resistor R10 may be coupled between the voltage source +3V3 and the second node. The second node may also be coupled to the MCU 30 via the pin OPFB_DET.

When an optical fiber 20 is inserted into the housing of the automatic light control switch 10, the optical fiber 20 passes between the light emitting diode and the light sensing component of the optical sensor switch 70, thereby changing the amount of light received by the light sensing component from the light emitting diode, and thereby changing the voltage at the second node. As such, by measuring the voltage at the second node, the MCU 30 can determine whether or not an optical fiber 20 has been inserted into the housing of the automatic light control switch 10.

As described above, embodiments of the present invention are directed to an indoor and outdoor automatic light control switch 10 that can be located indoors and control lighting through the use of an external optical fiber 20 to transmit information about outdoor lighting conditions (e.g., to transmit light from outdoors) in order for the indoor and outdoor automatic light control switch 10 to automatically determine whether it is day or night. In addition, in some embodiments, the indoor and outdoor automatic light control switch 10 may determine whether the external optical fiber 20 is inserted through the use of a micro-switch 60 or an optical sensor switch 70. In some embodiments, the indoor and outdoor automatic light control switch 10 indirectly determines whether the external optical fiber 20 is inserted based on comparing the signals detected from the built-in light sensor 40 and the external light sensor 50.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An automatic light control switch comprising:
   a housing configured to receive an optical fiber;
   a built-in light sensor located in the housing and configured to directly detect light through the housing;
   an external light sensor located in the housing and shielded from light, the external light sensor being configured to be coupled to the optical fiber and to detect light transmitted by the optical fiber; and
   a drive controller configured to:
      determine, automatically, a usage condition as one of an indoor condition and an outdoor condition in accordance with a condition signal, the indoor condition corresponding to the housing being located indoors, and the outdoor condition corresponding to the housing being located outdoors;
      in response to determining that the usage condition is the indoor condition, disable the built-in light sensor, enable the external light sensor, and control outdoor lighting in accordance with the external light sensor; and
      in response to determining that the usage condition is the outdoor condition, enable the built-in light sensor, disable the external light sensor, and control the outdoor lighting in accordance with the built-in light sensor.

2. The automatic light control switch of claim 1, further comprising:
   a micro-switch configured to be physically switched by the presence of the optical fiber in the housing,
   wherein a switching state of the micro-switch corresponds to the condition signal, and
   wherein the drive controller is configured to determine, automatically, the usage condition in accordance with the switching state of the micro-switch.

3. The automatic light control switch of claim 1, further comprising:
   an optical sensor switch configured to be optically switched by the presence of the optical fiber in the housing,
   wherein a switching state of the optical sensor switch corresponds to the condition signal, and
   wherein the drive controller is configured to determine, automatically, the usage condition in accordance with the switching state of the optical sensor switch.

4. The automatic light control switch of claim 1, wherein the drive controller is configured to determine, automatically, the usage condition in accordance with the condition signal received from the built-in light sensor and the external light sensor,
   wherein the drive controller is configured to determine the usage condition to be the indoor condition in response to receiving signals indicating detection of light by the external light sensor, and
   wherein the drive controller is configured to determine the usage condition to be the outdoor condition in response to receiving signals indicating the detection of light by the built-in light sensor and no signals indicating the detection of light by the external light sensor.

5. The automatic light control switch of claim 1, wherein the built-in light sensor comprises a photodiode.

6. The automatic light control switch of claim 1, wherein the external light sensor comprises a photodiode.

7. The automatic light control switch of claim 1, wherein the built-in light sensor comprises a photoresistor.

8. The automatic light control switch of claim 1, wherein the external light sensor comprises a photoresistor.

9. A method for controlling an automatic light control switch in accordance with an indoor or an outdoor usage condition, the automatic light control switch comprising a built-in light sensor, an external light sensor configured to be connected to an optical fiber, and a drive controller comprising a processor and memory, the method comprising:
   receiving, by the drive controller, a condition signal indicating an indoor condition or an outdoor condition;
   determining, by the drive controller, a usage condition as one of the indoor condition and the outdoor condition in accordance with the condition signal, the indoor condition corresponding to the automatic light control switch being located indoors, and the outdoor condition corresponding to the automatic light control switch being located outdoors;
   in response to determining that the usage condition is the indoor condition, disabling the built-in light sensor, enabling the external light sensor, and controlling outdoor lighting in accordance with the external light sensor; and
   in response to determining that the usage condition is the outdoor condition, enabling the built-in light sensor, disabling the external light sensor, and controlling the outdoor lighting in accordance with the built-in light sensor.

10. The method of claim 9, wherein the automatic light control switch further comprises a micro-switch configured to be physically switched by the presence of the optical fiber, and
   wherein the method further comprises:

determining a switching state of the micro-switch;
outputting the switching state of the micro-switch as the condition signal; and
determining the usage condition in accordance with the switching state of the micro-switch.

11. The method of claim 9, wherein the automatic light control switch further comprises an optical sensor switch configured to be optically switched by the presence of the optical fiber, and wherein the method further comprises:
determining a switching state of the optical sensor switch;
outputting the switching state of the optical sensor switch as the condition signal; and
determining the usage condition in accordance with the switching state of the optical sensor switch.

12. The method of claim 9, further comprising:
determining the usage condition in accordance with the condition signal received from the built-in light sensor and the external light sensor;
determining the usage condition to be the indoor condition in response to receiving signals indicating detection of light by the external light sensor; and
determining the usage condition to be the outdoor condition in response to receiving signals indicating detection of light by the built-in light sensor and no signals indicating the detection of light by the external light sensor.

13. The method of claim 9, wherein the built-in light sensor comprises a photodiode.

14. The method of claim 9, wherein the external light sensor comprises a photodiode.

15. The method of claim 9, wherein the built-in light sensor comprises a photoresistor.

16. The method of claim 9, wherein the external light sensor comprises a photoresistor.

* * * * *